United States Patent [19]

Kreevoy et al.

[11] 3,873,621

[45] Mar. 25, 1975

[54] METHOD FOR PREPARING AMINES

[75] Inventors: Maurice M. Kreevoy; Richard Frederic Borch, both of Minneapolis, Minn.; Jonathan Edward Colin Hutchins, Alhambra, Calif.

[73] Assignee: Regents of the University of Minnesota, Minneapolis, Minn.

[22] Filed: May 22, 1972

[21] Appl. No.: 255,772

[52] U.S. Cl. .......... 260/583 R, 260/570.8, 260/571, 260/518 R, 260/570.5, 260/397.2, 260/296, 260/583 R, 260/554 E, 260/566 R, 260/563 R, 260/577, 260/563 P
[51] Int. Cl. ............................................ C07c 85/08
[58] Field of Search ................................. 260/583 R

[56] References Cited
UNITED STATES PATENTS
2,298,284   10/1942   Emerson ......................... 260/577 R
2,420,584   5/1947   Brimer et al. .................... 260/583 R OTHER PUBLICATIONS
Abs. of Pap–Amer. Chem. Soc., 152.
Tet. Let. pp. 61–65 1960.
J. Amer. Chem. Soc.–July 2, 1969 3996–3397.

*Primary Examiner*—Elbert L. Roberts
*Assistant Examiner*—D. R. Phillips
*Attorney, Agent, or Firm*—Cushman, Darby & Cushman

[57] ABSTRACT

This invention relates to the reduction of compounds containing an imminium group to an amine with an alkali metal cyanoborohydride or quaternary ammonium cyanoborohydride or the corresponding deuterium and tritium labeled materials in a solvent selected from water, tetrahydrofuran, methanol, ethanol, diethyl ether or mixtures thereof at a pH between about 2 and 12, preferably, between about 5 and 7.

Compounds in which an aldehydic or ketonic functional group are to be reductively aminated are first converted to imines by an appropriate secondary or primary amine, or ammonia, which, in those cases, is included in the reaction mixture. Compounds in which the functional group to be reduced is an imine, substituted imine or imino ester are protonated by the reaction medium prior to reduction.

16 Claims, No Drawings

METHOD FOR PREPARING AMINES

This application is a continuation of our co-pending application Ser. No. 855,736 filed Sept. 5, 1958, now abandoned.

This invention relates to the reduction of compounds containing an imminium group to an amine by reduction with a cyanoborohydride of lithium, sodium or potassium, or a quaternary ammonium cyanoborohydride or the corresponding deuterium and tritium labeled materials.

G. Drefahl and E. Keil, J. Prakt Chem., 6,80, (1958) reported that lithium monocyanoborohydride, first prepared and described by G. Wittig, Ann. 578,209 (1951), because of its electronic structure is an outstandingly stable hydride. Drefahl and Keil report that aromatic and aliphatic carboxylic acids and esters, and azoxycompounds are not reduced by lithium monocyanoborohydrides. However, they report that aromatic and aliphatic aldehydes and alpha diketones were reduced. Their reactions were carried out in dioxane-water mixtures ranging up to pure dioxane, at reflux temperature with times up to 30 hours. This report is substantially in error, since several of the compounds reported as not reducible are actually reducible.

We have discovered that lithium, sodium and potassium cyanoborhydrides, quaternary ammonium cyanoborohydrides and the corresponding deuterium and tritium labeled materials will reduce a variety of functional groups with remarkable selectivity. The utility of the cyanoborohydrides is enhanced by its two unique properties among hydride reducing agents: (1) the reagent is stable in acid to pH 3, and at low pH the hydrogens can be readily exchanged; (2) Because imines are partially or wholly protonated at a pH of about 7, and the reduction of the protonated imines by cyanoborohydride is very facile, while the reduction of aldehydes and ketones is very slow at this pH, a very convenient method is provided for the reductive amination of aldehydes and ketones in yields which are near quantitative, and by prior exchange of the hydrogens for deuterium or tritium an efficient and economical route is available for deuteride or tritide reductive amination of aldehydes and ketones. The faster rate of reduction of the imminium moiety provides an excellent method for reductive amination of aldehydes and ketones under exceedingly mild conditions. The introduction of deuterium or tritium is accomplished by prior exchange of the cyanoborohydride with $D_2O$ or tritium labeled water at pH 3.

The method of the present invention contemplates the reduction of compounds containing an imminium group to an amine. This is accomplished by contacting at room temperature 1 mole of the compound to be reduced with an equivalent amount of one of the previously mentioned cyanoborohydrides or deuteride or tritide in a solvent selected from water, tetrahydrofuran, methanol, ethanol, diethyl ether or mixtures thereof at a pH between 2 and 12, preferably between about 5 and 7 until the imminium group is converted to an amine group. Compounds containing an imine group or an iminoester group first are converted to compounds containing an imminium group by contact with the above acid liquor. Compounds containing an aldehyde or ketone group are first converted to the corresponding compounds containing an imminium group by contact with a liquor at a pH between 2 and 12, preferably between 7 and 9, but which also contains a nitrogen compound, such as ammonia, primary or secondary amine, and then are reduced by the cyanoborohydride to compounds containing an amine group. If the reduction is carried out with substituted sodium pyruvate and ammonium chloride, good yields of amino acids are obtained.

The above reactions are illustrated by the following where $R_2$, $R_3$ and $R_4$ represent H, an alkyl group, substituted alkyl group, aryl group, substituted aryl groups, cycloalkyl groups, and cycloalkenyl groups, while $R_1$ may be alkoxy, substituted alkoxy, aryloxy, substituted aryloxy, thioalkyoxy, substituted thioalkoxy, thioaryloxy, or substituted thioaryloxy as well as any of the groups represented by $R_2$, $R_3$, and $R_4$.

1. Compounds containing an imminium group.

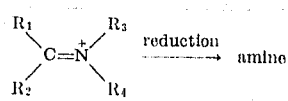

The imminium group may be represented by

2. Compounds containing an amine group.

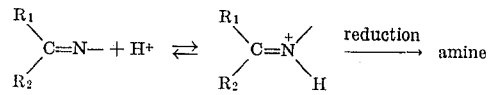

3. Compounds containing an iminoester group.

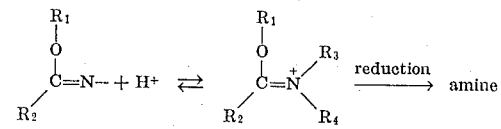

4. Compounds containing a ketone group.

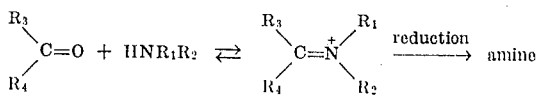

5. Compounds containing an aldehyde group.

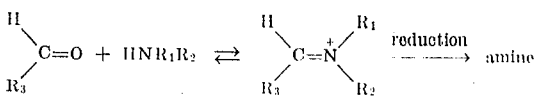

The preparation of lithium, sodim, potassium and quaternary ammonium cyanoborohydrides is described in the copending application of Robert C. Wade, Ser. No. 833,722, filed June 16, 1969 now U.S. Pat. No. 3,667,923 and Serial No. 833,766, filed June 16, 1969 now U.S. Pat. No. 3,697,232. The method comprises heating anhydrous hydrogen cyanide with an anhydrous borohydride selected from a quaternary ammonium borohydride, lithium or sodium borohydride at a temperature between about 0°C. and the boiling point of the solvent in an anhydrous solvent selected from tetrahydrofuran, glyme, diglyme, triglyme, and dimethyl formamide and mixtures thereof until hydrogen ceases to be evolved and all intermediate products have been converted to the desired cyanoborohydride corresponding to the selected borohydride. The method for preparing potassium cyanoborohydride is the same except that dimethyl formamide must be used as the solvent.

As quaternary ammonium cyanoborohydrides which may be used, we may mention tetramethyl, tetraethyl, tetrapropyl, tetraisopropyl, tetrabutyl, butyltrimethyl, phenyltrimethyl, benzyltrimethyl, (2-cyclohexyl) trimethyl, allyltrimethyl, (2-chloroethyl) trimethyl, 2-hydroxybutyl-trimethyl, (2-ethoxypropyl) trimethyl, alpha-amino-p-tolyl trimethyl, (3-cyanopropyl) trimethyl, (2-carboxyethyl) trimethyl, amyltrimethyl phenyl, cetyl trimethyl and tricaprylmethyl ammonium cyanoborohydrides and their corresponding deuterides and tritium labeled hydrides.

As primary and secondary amines in the reductive amination of ketones and aldehydes we may mention.

| Mono-and di-alkylamines, including isomers: | |
|---|---|
| methylamine | di-n-butylamine |
| dimethylamine | di-sec-butyl amine |
| ethylamine | di-isobutyl amine |
| diethylamine | n-amylamine |
| n-propylamine | sec-n-amylamine |
| isopropylamine | isoamylamine |
| di-(n-propyl)amine | tert-amylamine |
| di-(isopropyl) amine | etc. |
| n-butylamine | |
| tert-butylamine | |
| Aromatic amines: | |
| aniline | |
| naphthylamine | |

The following reactions with lithium or sodium cyanoborohydrides resulted in greater than 80% yield unless otherwise indicated:

PhCH=NET ⟶ CH₂NHET

OET
|
PhC=NMe ⟶ CH₃NHMe

OET
|
PhC=NPr ⟶                           Yield>95%

PhCH=NCH₂CH₃ ⟶ PhCH₂NHCH₂CH₃    Yield 65%

PhC(OET)=NCH₂CH₂CH₃ ⟶
                      PhCH₂NHCH₂CH₂CH₂CH₃   Yield 95%

Thiamine ⟶ dihydrothiamine or tetrahydrothiamin

Representative reductive aminations with lithium or sodium cyanoborohydride in methanol at 25°C. are given in the following table.

Synthesis of 

A solution of

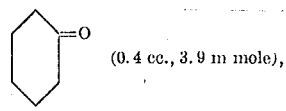

(0.4 cc., 3.9 m mole), n-propylamine (1.7cc, ~ 20m mole, and NaBH₃CN (65mg, 1.0m mole in 10 ml of MeOH was treated with 1 ml of ca. 4M. HCl/MeOH and stirred 90 hr. at 25°. The methanol was evaporated at reduced pressure and the residue dissolved in 5ml 1N NaOH and extracted with 4+5 ml of ether. The combined ether extracts were extracted with 4+5 ml 1N HCl. The HCl extracts were made basic with 6N NaOH and back-extracted with 4+5 ml ether. The extracts were dried (MgSO₄) and evaporated to give 395 mg. of basic product. Glpc analysis showed 78%

22 percent of another amine, probably

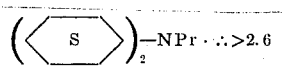

moles product/mole NaBH₃CN used.

Synthesis of N-cyclohexyl-N-propyl amine 2 grams cyclohexanone (20mM), 6 grams n-propyl amine (100mM), 50 mM HCl/MeOH were added to 35 ml absolute methanol in a 125 Erlenmeyer flask at room temperature. To this mixture was added 3.0 grams NaBH₃CN.C₄H₈O₂ (20 mM, 60 mM, hydride) and the mixture allowed to stand for 3 days at room temperature (flask stoppered with a cork). The methanolic solution was made strongly basic with 20 percent NaOH (~50 ml) and extracted with 5 × 20 ml ether. The ether was washed with 4 × 15 ml 2N HCl and the washings combined. The acid water layer was washed with 4 × 15 ml ether and then made strongly basic with solid KOH (cooling in ice bath necessary). The basic solution was extracted with 5 × 20 ml ether, the ether layers combined and washed with 4 × 20 ml saturated salt solution, and the ether dried over MgSO₄. The sol-

| Compound | Amine | Time (hrs.) | Product | Yield Anal. | Yield Isolated |
|---|---|---|---|---|---|
| 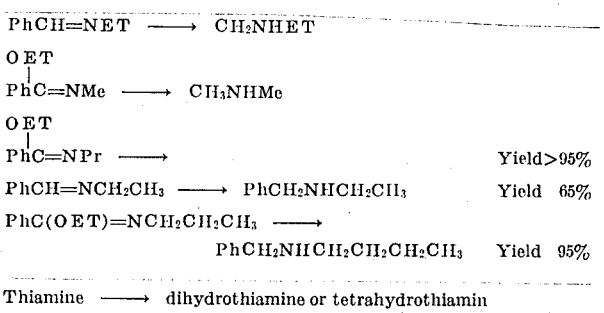 | NH₃ | 36 | —NH₂ | 63 | 48 |
| PhCHO | CH₃CH₂CH₂NH₂ | 72 | PhCH₂NHET | 91 | 80 |
| Cyclohexanone | CH₃CH₂CH₂NH₂ | 84 | N-propylcyclohexylamine | 90 | 81 |
| Cyclododecanone | CH₃NHCH₃ | 96 | N,N-dimethylcyclododecylamine | 71 | 66 |
| ⬡=O | PrNH₂ | -- | ⬡—NHCH₂CH₂CH₃ | | |
| Sodium phenylpyruvate | NH₃ | 36 | d,1-phenylalanine | 49 | 41 | vent was removed to give a light colored oil which V.P.C. showed to be essentially pure (2.2 grams crude oil). This material was distilled through a short path under vacuum to yield 1.5 grams of a water white liquid whose IR showed a weak N-H stretch at 3280 cm$^{-1}$ and no carbonyl peaks in the region 1800 cm$^{-1}$ to 1600 cm$^{-1}$. This gives an isolated yield of 54 percent (Note: Crude yield was 78.5 percent.)

Synthesis of Alanine 110 mg sodium pyruvate (1mM), 500 mg NH$_4$Br (5 mM) and 151 mg NaBH$_3$CN C$_4$H$_8$O$_2$ were dissolved in 15 ml absolute MeOH and allowed to stand at room temperature for 3 days. At the end of this time concentrated (6N) HCl was added to hydrolyze the hydride. The solvent and excess HCl were removed on a roto-vac and the residue dissolved in H$_2$O and placed on a Dowex-50 ion-exchange resin in the acid form. The resin was washed with distilled water (2 liters) and the amino acid removed from the column with excess 1.5N ammonia. The ammonia solution was taken to dryness on a roto-vac and the residue dissolved in water. This solution was compared on T.L.C. cellulose with an authentic sample of alanine (BuOH, HOAc, H$_2$O 4:1:1). There was found to be only one ninhydrin positive spot with correspondence to alanine. Quantitative ninhydrin showed the yield to be 47 percent in this reaction.

Synthesis of Other Compounds

SYNTHESIS OF OTHER COMPOUNDS

Amines synthesized with LiBH$_3$CN and NaBH$_3$CN

| | | Percent | |
|---|---|---|---|
| | | Analytical yield | Isolated yield |
| 1... cyclohexanone → | | 80 | 65 |
| 2... 2-norbornanone → | | 63 | 49 |
| 3... cycloheptanone → | | | |
| 4... cyclooctanone → | | 56.5 | 48 |
| 5... cyclododecanone → | | 72 | 64 |
| 6... acetophenone → | | 76 | 69 |
| 7... phenyl isopropyl ketone → | | 89 | 74 |
| 8... dibenzyl ketone → | | 85 | 77.5 |

SYNTHESIS OF OTHER COMPOUNDS—Continued

| | Percent | |
|---|---|---|
| | Analytical yield | Isolated yield |
| 9. 3-acetyl pyridine → 1-(pyridin-3-yl)ethylamine | -------- | 54 |

Secondary amines

| | Analytical yield | Isolated yield |
|---|---|---|
| 10. Cyclohexanone + CH$_3$NH$_3^+$Cl$^-$ → N-methylcyclohexylamine | 45 | 40 |
| 11. Cycloheptanone (7) + CH$_3$NH$_3^+$Cl$^-$ → N-methylcycloheptylamine | 75 | 63 |
| 12. Cyclooctanone (8) + CH$_3$NH$_3^+$Cl$^-$ → N-methylcyclooctylamine | 85 | 71.5 |
| 13. Cyclooctanone (8) + isobutylamine → N-isobutylcyclooctylamine | 86 | 79 |
| 14. Cyclododecanone + CH$_3$NH$_3^+$Cl$^-$ → N-methylcyclododecylamine | 83 | 75 |
| 15. Acetophenone + CH$_3$NH$_3^+$Cl$^-$ → N-methyl-1-phenylethylamine | 90 | 71 |
| 16. Isobutyrophenone + CH$_3$NH$_3^+$Cl$^-$ → N-methyl-2-methyl-1-phenylpropylamine | 91 | 90.5 |
| 17. 1,3-diphenylacetone + CH$_3$NH$_3^+$Cl$^-$ → N-methyl-1,3-diphenyl-2-propylamine | 93 | 54.5 |
| 18. 2-heptanone + CH$_3$NH$_3^+$Cl$^-$ → N-methyl-2-heptylamine | 83 | 46.5 |
| 19. 3,4-dimethoxybenzaldehyde + CH$_3$NH$_3^+$Cl$^-$ → N-methyl-3,4-dimethoxybenzylamine | 69 | 52 |
| 20. Norcamphor + CH$_3$NH$_3^+$Cl$^-$ → N-methylnorbornylamine | 84 | 45 |

SYNTHESIS OF OTHER COMPOUNDS—Continued

| | | Percent | |
|---|---|---|---|
| | | Analytical yield | Isolated yield |
| Tertiary amines synthesized with LiBH₃CN and NaBH₃CN | | | |
| 21 | cyclohexanone + (CH₃)₂NH → N,N-dimethylcyclohexylamine | 80 | 72 |
| 22 | norbornanone + DMA* → norbornyl-N(CH₃)₂ | 75 | 52 |
| 23 | cycloheptanone (7) + DMA* → cycloheptyl-N(CH₃)₂ (7) | 66 | 62.5 |
| 24 | cyclooctanone (8) + DMA* → cyclooctyl-N(CH₃)₂ (8) | 68 | 60 |
| 25 | adamantanone + DMA* → adamantyl-N(CH₃)₂ | 70 | 67 |
| 26 | acetophenone + DMA* → α-methylbenzyl-N(CH₃)₂ | 58 | 50 |
| 27 | dibenzyl ketone + DMA* → bis-benzyl-N-methyl amine | 46 | 39 |
| 28 | cyclopentanone + DMA* → cyclopentyl-N(CH₃)₂ | -------- | 57 |
| 29 | 3,4,5-trimethoxybenzaldehyde + DMA* → 3,4,5-trimethoxybenzyl-N(CH₃)₂ | 92 | 54 |
| 30 | 2-hexanone + DMA* → 2-hexyl-N(CH₃)₂ | 68 | 47 |
| 31 | 4-heptanone + DMA* → 4-heptyl-N(CH₃)₂ | ....... | 61.5 |
| 32 | 4-nonanone + DMA* → 4-nonyl-N(CH₃)₂ | ....... | 80 |

SYNTHESIS OF OTHER COMPOUNDS—Continued

| | | | Percent | |
|---|---|---|---|---|
| | | | Analytical yield | Isolated yield |
| 33 | cholestanone + DMA* → (CH₃)₂N-steroid | | -------- | 60 |
| 34 | 4,4-dimethyl-2-pentanone + DMA* → product with N(CH₃)₂ | | -------- | 53 |
| Amines with NaBH₃CNC₄H₈O₂ | | | | |
| 35 | cyclohexanone =O + propylamine NH₂ → N–CH₂CH₂CH₃ product | | ------------ | 77 |
| Amino acids from LiBH₃CN | | | | |
| 36 | sodium pyruvate + NH₄⁺Cl⁻ → alanine (NH₃⁺, CO₂⁻) | | ------------ | 52 |
| 37 | sodium phenylpyruvate + NH₄⁺Cl⁻ → phenylalanine | | ------------ | 49 |
| 38 | 2-ketoglutaric acid + NH₄⁺Cl⁻ → glutamic acid | | 53 | ---------- |
| 39 | 2-ketosuccinic acid + NH₄⁺Cl⁻ → aspartic acid | | ------------ | ------------ |
| Amino acids from NaBH₃CNC₄H₈O₂ | | | | |
| 40 | CH₃–C(=O)–COO⁻Na⁺ + NH₄⁺Br⁻ → CH₃–C(NH₃⁺)(H)–COO⁻ (sodium pyruvate) | | 47 | ---------- |

*Dimethylamine.

The numerous examples of the reaction of the invention indicate that the sole requirement of the compound being converted to an amine is that it contain an imminium group. These examples indicate that substituents on the organic moieties $R_1$, $R_2$, $R_3$, and $R_4$ do not affect the operativeness of the reduction reaction. In this connection attention is called to the reaction given on page 5, line 10 (sodium phenyl pyruvate) and page 9, reaction number 37; reactions numbers 8 and 17 on page 7 (phenyl substituted alkyl); reactions numbers 19 and 29 on page 8 (alkoxy substituted aryl); reaction number 27 on page 8 (phenyl substituted alkyl); and reactions numbers 38 and 39 on page 9 (carboxyl substituted alkyl).

This application is a continuation of our co-pending application Ser. No. 855,736 filed Sept. 5, 1958, now abandoned.

We claim:

1. The method which comprises contacting a compound represented by the structural formula

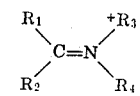

with a substantially equivalent amount of a cyanoborohydride selected from the group consisting of lithium, sodium, potassium and quaternary ammonium cyanoborohydrides and their corresponding deuterides and tritides and mixtures thereof in a solvent selected from the group consisting of water, tetrahydrofuran, methanol, ethanol, diethyl ether and mixtures thereof and having pH between about 2 and 12 for a period of time sufficient to convert the imminium group to an amine group, $R_1$, $R_2$, $R_3$, and $R_4$ being selected from the group consisting of H, alkyl, aryl, cycloalkyl and cycloalkenyl groups,

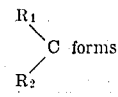

forms a carbon ring, said compound being soluble in the selected solvent.

2. The method which comprises contacting a compound represented by the structural formula

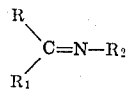

with a substantially equivalent amount of a cyanoborohydride selected from the group consisting of lithium, sodium, potassium and quaternary ammonium cyanoborohydrides and their corresponding deuterides and tritides and mixtures thereof in a solvent selected from the group consisting of water, tetrahydrofuran, methanol, ethanol, diethyl ether and mixtures thereof having a pH between about 2 to 12 for a period of time sufficient to convert the imine group to an imminium group and convert the imminium group to an amine group, R, $R_1$ and $R_2$ being selected from the group consisting of H, alkyl, aryl, cycloalkyl, and cycloalkenyl groups,

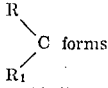

forms a carbon ring, said compound being soluble in the selected solvent.

3. The method which comprises contacting a compound represented by the structural formula

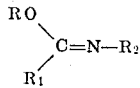

with a substantially equivalent amount of a cyanoborohydride selected from the group consisting of lithium, sodium, potassium and quaternary ammonium cyanoborohydrides and their corresponding deuterides and tritides and mixtures thereof in a solvent selected from the group consisting of water, tetrahydrofuran, methanol, ethanol, diethyl ether and mixtures therof having a pH between about 2 and 12 for a period of time sufficient to convert the iminoester group to an imminium group and convert the imminium group to an amine group, $R_1$, and $R_2$ being selected from the group consisting of H, alkyl, $R_1$ aryl, cycloalkyl, and cycloalkenyl groups,

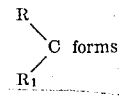

forms a carbon ring said compound being soluble in the selected solvent.

4. The method which comprises contacting a first compound selected from those represented by the structural formula consisting of

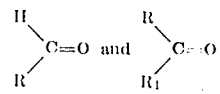

with a substantially equivalent amount of a cyanoborohydride selected from the group consisting of lithium, sodium, potassium and quaternary ammonium cyanoborohydrides and their corresponding deuterides and tritides and mixtures thereof in a solvent selected from the group consisting of water, tetrahydrofuran, methanol, ethanol, diethyl ether and mixtures thereof having a pH between about 2 and 12, said solvent also containing a nitrogen compound selected from the group consisting of ammonia, primary alkyl and aryl amines and secondary alkyl amines, said contacting continuing for a period sufficient to convert the selected first compound to a compound containing an imminium group and convert the imminium group to an amine group, R and $R_1$ representing a group selected from the group consisting of alkyl, $R_1$ representing a group selected from the group consisting of alkyl, aryl, cycloalkyl, and cycloalkenyl groups,

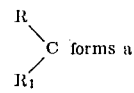

forms a carbon ring said first compound being soluble in the selected solvent.

5. The method as claimed by claim 1 wherein the pH is between about 5 and 7.
6. The method as claimed by claim 2 wherein the pH is between about 5 and 7.
7. The method as claimed by claim 3 wherein the pH is between about 5 and 7.
8. The method as claimed by claim 1 wherein the pH is between about 7 and 9.
9. The method as claimed by claim 5 wherein the cyanoborohydride is sodium cyanoborohydride.
10. The method as claimed by claim 6 wherein the cyanoborohydride is sodium cyanoborohydride.
11. The method as claimed by claim 7 wherein the cyanoborohydride is sodium cyanoborohydride.
12. The method as claimed by claim 8 wherein the cyanoborohydride is sodium cyanoborohydride.
13. The method of claim 1 wherein $R_1$, $R_2$, $R_3$ and $R_4$ are H or alkyl.
14. The method of claim 2 wherein R, $R_1$ and $R_2$ are H or alkyl.
15. The method of claim 3 wherein $R_1$ and $R_2$ are H or alkyl.
16. The method of claim 4 wherein R and $R_1$ are H or alkyl.

* * * * *